US012794250B2

(12) United States Patent
Peng et al.

(10) Patent No.: US 12,794,250 B2
(45) Date of Patent: Nov. 10, 2026

(54) POWER MANAGEMENT SYSTEM, MICRO-CONTROLLER UNIT, BATTERY MANAGEMENT SYSTEM, AND BATTERY

(71) Applicant: CONTEMPORARY AMPEREX TECHNOLOGY (HONG KONG) LIMITED, Hong Kong (CN)

(72) Inventors: Ke Peng, Ningde (CN); Tingting Lan, Ningde (CN); Biao Han, Ningde (CN); Ye Yang, Ningde (CN); Peng Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 532 days.

(21) Appl. No.: 18/459,157

(22) Filed: Aug. 31, 2023

(65) Prior Publication Data

US 2023/0411971 A1 Dec. 21, 2023

Related U.S. Application Data

(63) Continuation of application No. PCT/CN2021/127585, filed on Oct. 29, 2021.

(51) Int. Cl.
*H02J 7/00* (2026.01)
*H02J 7/60* (2026.01)
(Continued)

(52) U.S. Cl.
CPC ................ *H02J 7/64* (2026.01); *H02J 7/663* (2026.01); *H02J 7/971* (2026.01)

(58) Field of Classification Search
None
See application file for complete search history.

(56) References Cited

U.S. PATENT DOCUMENTS 10,283,977 B2 5/2019 Katrak
11,095,132 B2 8/2021 Luo et al.
(Continued)

FOREIGN PATENT DOCUMENTS

CN 102082503 A 6/2011
CN 102200824 A 9/2011
(Continued)

OTHER PUBLICATIONS

State Intellectual Property Office of China The First Office Action for Application No. 202180055436.9 May 31, 2025 15 pages (including translation).
(Continued)

*Primary Examiner* — Arun C Williams
(74) *Attorney, Agent, or Firm* — ANOVA LAW GROUP, PLLC

(57) ABSTRACT

A power management system includes a primary power supply module, configured to be connected to a power supply and configured to generate a first voltage based on a voltage of the power supply, diagnose the first voltage, and store a diagnosis result of the first voltage; a secondary power supply module, connected to the primary power supply module and configured to generate a second voltage based on the first voltage; and a micro-controller unit (MCU), connected to the primary power supply module and the secondary power supply module and configured to read the diagnosis result of the first voltage from the primary power supply module and determine, based on the diagnosis result of the first voltage, whether to control a battery management system (BMS) to enter a safe state. The second voltage is lower than the first voltage and is an operating voltage of the MCU.

14 Claims, 5 Drawing Sheets

(51) Int. Cl.
*H02J 7/64* (2026.01)
*H02J 7/90* (2026.01)

(56) References Cited

U.S. PATENT DOCUMENTS

| | | | | |
|---|---|---|---|---|
| 2014/0247014 | A1* | 9/2014 | Nishikawa | H02J 7/865 320/126 |
| 2017/0373356 | A1 | 12/2017 | Katrak | |
| 2017/0373357 | A1 | 12/2017 | Katrak | |
| 2019/0035175 | A1 | 1/2019 | Katrak | |
| 2019/0039457 | A1 | 2/2019 | Katrak | |
| 2020/0274369 | A1 | 8/2020 | Luo et al. | |
| 2021/0075325 | A1 | 3/2021 | Singh | |
| 2023/0111470 | A1 | 4/2023 | Su et al. | |

FOREIGN PATENT DOCUMENTS

| | | | |
|---|---|---|---|
| CN | 105150874 | A | 12/2015 |
| CN | 205027882 | U | 2/2016 |
| CN | 205846852 | U | 12/2016 |
| CN | 107515658 | A | 12/2017 |
| CN | 108466554 | A | 8/2018 |
| CN | 109358548 | A | 2/2019 |
| CN | 109888864 | A | 6/2019 |
| CN | 110199428 | A | 9/2019 |
| CN | 110661043 | A | 1/2020 |
| CN | 111668902 | A | 9/2020 |
| KR | 20150072895 | A | 6/2015 |
| KR | 20200031925 | A | 3/2020 |
| KR | 20210087816 | A | 7/2021 |
| WO | 2010127644 | A2 | 11/2010 |
| WO | 2016114116 | A1 | 7/2016 |

OTHER PUBLICATIONS

The Korean Intellectual Property Office Notice of Preliminary Rejection for Application No. 10-2023-7027841 Aug. 11, 2025 16 Pages (including translation).

The World Intellectual Property Organization (WIPO) International Search Report and Written Opinion for PCT/CN2021/127585 Mar. 16, 2022 11 pages (with translation).

The European Patent Office (EPO) The Extended European Search Report for Application No. 21961913.7 Jun. 10, 2024 7 Pages.

The Japan Patent Office (JPO) Notification of Reasons for Refusal for Application No. 2023-550107 Aug. 13, 2024 6 Pages(including translation).

European Patent Office Extended European Search Report for Application No. 26173379.4 Jul. 1, 2022, 2026 12 pages.

* cited by examiner

POWER MANAGEMENT SYSTEM, MICRO-CONTROLLER UNIT, BATTERY MANAGEMENT SYSTEM, AND BATTERY

CROSS-REFERENCE TO RELATED APPLICATION

This application is a continuation of International Application No. PCT/CN2021/127585, filed on Oct. 29, 2021, the entire content of which is incorporated herein by reference.

TECHNICAL FIELD

This application relates to the field of battery technologies, and in particular, to a power management system, a micro-controller unit, a battery management system, and a battery.

BACKGROUND

A battery management system (Battery Management System, BMS) includes a power management system and a micro-controller unit (Micro-Controller Unit, MCU), where the power management system provides a required stable voltage for the MCU. However, due to the upgrade of the micro-controller unit (Micro-Controller Unit, MCU), the existing power management system cannot meet the power supply and voltage safety requirements of the upgraded MCU. Therefore, the structure of the power management system needs to be optimized, so as to expand the voltage range provided by the power management system and enhance the reliability of output voltage.

SUMMARY

This application provides a power management system, a micro-controller unit, a battery management system, and a battery. The power management system can meet power supply requirements of an MCU and has higher reliability.

According to a first aspect, a power management system is provided, including:

- a primary power supply module, connected to a power supply and including a first voltage conversion unit, a first voltage monitoring unit, and a first storage unit, where the first voltage conversion unit is configured to generate a first voltage based on a voltage of the power supply, the first voltage monitoring unit is configured to diagnose the first voltage, and the first storage unit is configured to store a diagnosis result of the first voltage;
- a secondary power supply module, connected to the primary power supply module and including a second voltage conversion unit, where the second voltage conversion unit is configured to generate a second voltage based on the first voltage, the second voltage being lower than the first voltage, and the second voltage being an operating voltage of an MCU; and
- the MCU, connected to the primary power supply module and the secondary power supply module and configured to read the diagnosis result of the first voltage from the first storage unit and determine, based on the diagnosis result of the first voltage, whether to control a BMS to enter a safe state.

Based on this technical solution, a two-stage power supply system is used in the power management system, including the primary power supply module and the secondary power supply module. The primary power supply module supplies the first voltage to the secondary power supply module, and the secondary power supply module supplies the second voltage to the MCU based on the first voltage for normal operation of the MCU. The secondary power supply module is provided to supply a compatible voltage to the MCU, so that the compatibility between the power management system of the BMS and the MCU is ensured. In addition, because the primary power supply module can diagnose the first voltage, the MCU can control the BMS to enter the safe state when the first voltage experiences overvoltage or undervoltage by reading the diagnosis result of the first voltage, which improves the reliability of the BMS and ensures the safety of the BMS.

In a possible implementation, the first voltage monitoring unit is further configured to output a state signal, the state signal being used to indicate the diagnosis result of the first voltage. The MCU is specifically configured to read the state signal, read the diagnosis result of the first voltage from the first storage unit based on the state signal, and control the BMS to enter the safe state when diagnosis results of the first voltage obtained from N consecutive readings all indicate that the first voltage experiences overvoltage or undervoltage, N being a positive integer.

In this embodiment, the state signal output by the primary power supply module is used to indicate the diagnosis result of the first voltage, and the MCU can determine, based on the state signal, a way of reading the diagnosis result of the first voltage from the primary power supply module, for example, a frequency at which such reading operation is performed. This can ensure the effective acquisition of the diagnosis result and can also reduce unnecessary reading operations, saving time and resources.

In a possible implementation, when the state signal indicates that the diagnosis result of the first voltage is that the first voltage experiences overvoltage or undervoltage, the MCU reads the diagnosis result of the first voltage from the first storage unit at a frequency equal to a frequency at which the MCU reads the state signal; and/or when the state signal indicates that the diagnosis result of the first voltage is that the first voltage experiences no overvoltage or undervoltage, the MCU reads the diagnosis result of the first voltage from the first storage unit at a frequency lower than a frequency at which the MCU reads the state signal.

In this embodiment, when the state signal output by the primary power supply module indicates that the first voltage experiences overvoltage or undervoltage, the MCU reads the diagnosis result of the first voltage from the first storage unit at the frequency equal to the frequency at which the MCU reads the state signal, so as to ensure reliable determining of the first voltage. Conversely, when the state signal indicates that the first voltage experiences no overvoltage or undervoltage, the MCU reads the diagnosis result of the first voltage from the first storage unit at the frequency lower than the frequency at which the MCU reads the state signal, avoiding unnecessary reading operations.

In a possible implementation, the first voltage monitoring unit is further configured to output a state signal, the state signal being used to indicate the diagnosis result of the first voltage; and the secondary power supply module is further configured to receive the state signal and prohibit output of the second voltage when the state signal indicates that the diagnosis result of the first voltage is that the first voltage experiences overvoltage or undervoltage.

In a possible implementation, the MCU is specifically configured to periodically read the diagnosis result of the first voltage from the first storage unit and control the BMS to enter the safe state when diagnosis results of the first voltage obtained from N consecutive readings all indicate that the first voltage experiences overvoltage or undervoltage.

In the foregoing embodiment, the MCU is configured to read the diagnosis result of the first voltage from the first storage unit and control the BMS to enter the safe state when diagnosis results of the first voltage obtained from N consecutive readings all indicate that the first voltage experiences overvoltage or undervoltage, improving the safety of the BMS. In addition, the secondary power supply module reads the state signal output by the primary power supply module and no longer outputs the second voltage to the MCU when the state signal indicates that the first voltage experiences overvoltage or undervoltage, so as to enable the BMS to enter the safe state, avoiding the risk caused by the failure to read the diagnosis result due to the failure of the MCU. The MCU and the secondary power supply module jointly participate in determining the diagnosis result of the first voltage V1, so that the safety of the BMS is further improved.

In a possible implementation, the secondary power supply module further includes a second voltage monitoring unit and a second storage unit, where the second voltage monitoring unit is configured to diagnose the second voltage, and the second storage unit is configured to store a diagnosis result of the second voltage. The MCU is further configured to read the diagnosis result of the second voltage from the second storage unit and determine, based on the diagnosis result of the second voltage, whether to control the BMS to enter the safe state.

In this embodiment, in addition to detecting the state signal output by the primary power supply module, the MCU also reads the diagnosis result of the second voltage from the secondary power supply module and controls the BMS to enter the safe state when the second voltage experiences overvoltage or undervoltage, further improving the safety of the BMS.

In a possible implementation, the MCU is further configured to detect a state of the MCU and send a fault signal to the secondary power supply module when the state of the MCU indicates a fault. The secondary power supply module is further configured to receive the fault signal and send a reset signal to the MCU based on the fault signal.

In a possible implementation, a relay control module is further included, where the relay control module is connected to the primary power supply module and the MCU. The first voltage monitoring unit is further configured to send a safety signal to the relay control module when the diagnosis result of the first voltage is that the first voltage experiences overvoltage or undervoltage; and the relay control module is configured to receive the safety signal and control, based on the safety signal, a relay to maintain connection of a high voltage loop within a preset duration.

In a possible implementation, the first voltage conversion unit is further configured to generate a third voltage based on the voltage of the power supply, where the third voltage is an operating voltage of other loads in the BMS, and the third voltage is higher than the first voltage.

In this embodiment, the primary power supply module can output two voltages: the third voltage for the other loads and the first voltage for the secondary power supply module. This not only meets the power needs of the other loads, but also ensures the normal operation of the MCU by supplying the second voltage by the secondary power supply module to the MCU based on the first voltage.

In a possible implementation, the MCU is connected to the primary power supply module via an I2C bus; and/or the MCU is connected to the secondary power supply module via an I2C bus.

In a possible implementation, the first voltage is 3.3 V, and the second voltage is 1.8 V or 0.8V.

According to a second aspect, a control method of power management system is provided. The power management system includes a primary power supply module and a secondary power supply module, where the primary power supply module is connected to a power supply and configured to generate a first voltage based on a voltage of the power supply, diagnose the first voltage, and store a diagnosis result of the first voltage; and the secondary power supply module is connected to the primary power supply module and configured to generate a second voltage based on the first voltage, the second voltage being lower than the first voltage, the second voltage being an operating voltage of an MCU, and the MCU being connected to the primary power supply module and the secondary power supply module. The method includes:

reading, by the MCU, the diagnosis result of the first voltage from the primary power supply module; and determining, by the MCU based on the diagnosis result of the first voltage, whether to control a BMS to enter a safe state.

Based on this technical solution, a two-stage power supply system is used in the power management system, including the primary power supply module and the secondary power supply module. The primary power supply module supplies the first voltage to the secondary power supply module, and the secondary power supply module supplies the second voltage to the MCU based on the first voltage for normal operation of the MCU. The secondary power supply module is provided to supply a compatible voltage to the MCU, so that the compatibility between the power management system of the BMS and the MCU is ensured. In addition, because the primary power supply module can diagnose the first voltage, the MCU can control the BMS to enter the safe state when the first voltage experiences overvoltage or undervoltage by reading the diagnosis result of the first voltage, which improves the reliability of the BMS and ensures the safety of the BMS.

In a possible implementation, the method further includes: reading, by the MCU, a state signal output by the primary power supply module, the state signal being used to indicate the diagnosis result of the first voltage, where the determining, by the MCU based on the diagnosis result of the first voltage, whether to control the BMS to enter a safe state includes: reading, by the MCU based on the state signal, the diagnosis result of the first voltage from the primary power supply module, and controlling the BMS to enter the safe state when diagnosis results of the first voltage obtained from N consecutive readings all indicate that the first voltage experiences overvoltage or undervoltage, N being a positive integer.

In a possible implementation, the method further includes: when the state signal indicates that the diagnosis result of the first voltage is that the first voltage experiences overvoltage or undervoltage, reading, by the MCU, the diagnosis result of the first voltage from the first storage unit at a frequency equal to a frequency at which the MCU reads the state signal; or when the state signal indicates that the diagnosis result of the first voltage is that the first voltage experiences no overvoltage or undervoltage, reading, by the MCU, the diagnosis result of the first voltage from the first storage unit at a frequency lower than a frequency at which the MCU reads the state signal.

In a possible implementation, the determining, by the MCU based on the diagnosis result of the first voltage, whether to control the BMS to enter a safe state includes: periodically reading, by the MCU, the diagnosis result of the first voltage from the primary power supply module, and controlling the BMS to enter the safe state when diagnosis results of the first voltage obtained from N consecutive readings all indicate that the first voltage experiences overvoltage or undervoltage.

In a possible implementation, the first voltage monitoring unit is further configured to output a state signal, where the state signal is used to indicate the diagnosis result of the first voltage. The secondary power supply module is further configured to receive the state signal and prohibit output of the second voltage to the MCU when the state signal indicates that the diagnosis result of the first voltage is that the first voltage experiences overvoltage or undervoltage.

In a possible implementation, the secondary power supply module is further configured to diagnose the second voltage and store a diagnosis result of the second voltage. The method further includes: reading, by the MCU, the diagnosis result of the second voltage from the secondary power supply module; and determining, based on the diagnosis result of the second voltage, whether to control the BMS to enter the safe state.

In a possible implementation, the method further includes: detecting, by the MCU, a state of the MCU; sending a fault signal to the secondary power supply module when the MCU detects that the state of the MCU indicates a fault; and receiving, by the MCU, a reset signal sent by the secondary power supply module based on the fault signal.

In a possible implementation, the MCU is connected to the primary power supply module via an I2C bus; and/or the MCU is connected to the secondary power supply module via an I2C bus.

In a possible implementation, the first voltage is 3.3 V, and the second voltage is 1.8 V or 0.8 V.

According to a third aspect, an MCU is provided and configured to perform the control method of BMS according to any one of the second aspect or the possible implementations of the second aspect.

According to a fourth aspect, a BMS is provided, including: the power management system according to any one of the first aspect or the possible implementations of the first aspect; and the MCU according to any one of the third aspect or the possible implementations of the third aspect.

According to a fifth aspect, a battery is provided, including the BMS according to any one of the fourth aspect or the possible implementations of the fourth aspect.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

DESCRIPTION OF EMBODIMENTS

Figure 1:
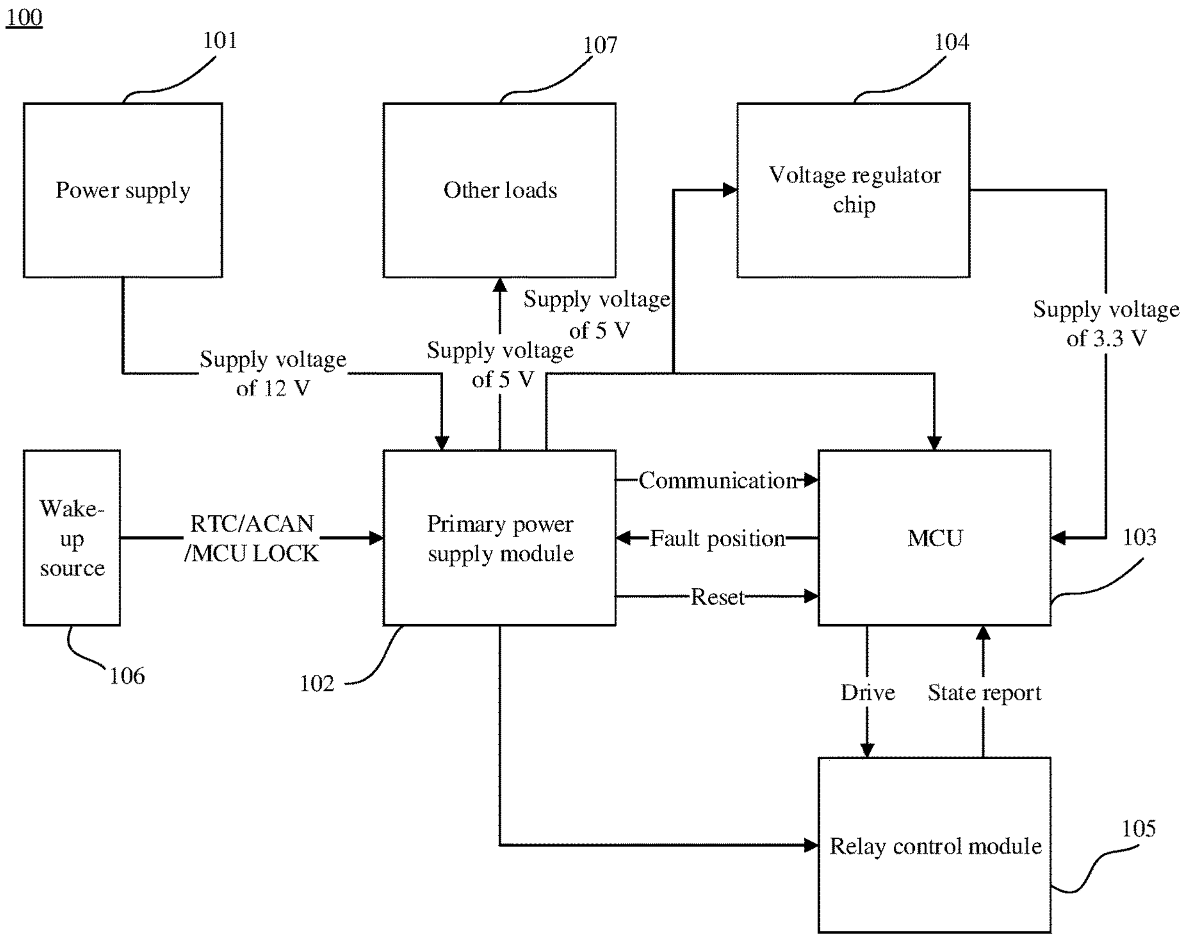
FIG. 1 is a schematic structural diagram of an existing power management system.

The following further describes embodiments of this application in detail with reference to the accompanying drawings and examples. The following detailed description of embodiments and the accompanying drawings are intended to illustrate the principle of this application rather than to limit the scope of this application, meaning that this application is not limited to the embodiments as described.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to the orientations shown in the drawings and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

FIG. 1 is a schematic structural diagram of an existing power management system. As shown in FIG. 1, a power management system 100 includes a power supply 101, a primary power supply module 102, an MCU 103, a voltage regulator chip 104, a relay control module 105, a wake-up source 106, and other loads 107. The primary power supply module 102 converts a 12 V voltage output by the power supply 101 into a 5 V voltage to supply a required 5 V operating voltage to the other loads 107 and output a 3.3 V voltage to the voltage regulator chip 104, and the voltage regulator chip 104 converts the 5 V voltage into a required 3.3 V voltage for the MCU 103, so as to ensure normal operation of the MCU 103. The primary power supply module 102 is also required to supply a 5 V voltage to some I/O ports in the MCU 103 (not shown in the figure). It should be noted that two voltages output by the primary power supply module 102 are both 5 V voltages, where one of the 5 V voltages is output to the voltage regulator chip 104 and converted into a 3.3 V voltage by the voltage regulator chip 104, and the other 5 V voltage is output to the other loads 107. This is because if two different voltages are output by the primary power supply module 102 at the same time, for example, a 5 V voltage and a 3.3 V voltage are directly output, more loads in the current BMS use the 5 V voltage and fewer loads use the 3.3 V voltage, so that the current load capacity of the loop on which the 5 V voltage is output may not be enough, resulting in loss of some functions. The 5 V voltage is converted into the 3.3 V voltage by the voltage regulator chip 104, and the 3.3 V voltage is then output by the voltage regulator chip 104 to the MCU 103, so that the problems caused by load imbalance on the primary power supply module 102 can be prevented.

Because the current platform resources cannot meet the increasing functional requirements of the BMS, the MCU in the BMS is upgraded. However, the upgraded MCU requires a smaller voltage, for example, its operating voltage becomes 1.8 V or 0.8 V, and the upgraded MCU cannot be adapted to the power management system of the current BMS, so that the existing power management system cannot meet the power supply and voltage safety requirements of the upgraded MCU.

In view of this, this application provides a power management system that changes the original one-stage power supply system into a two-stage power supply system to supply a compatible voltage to the MCU. In addition, a voltage diagnosis mechanism is added, ensuring the reliability of the output voltage and improving the safety of the BMS.

Figure 2:
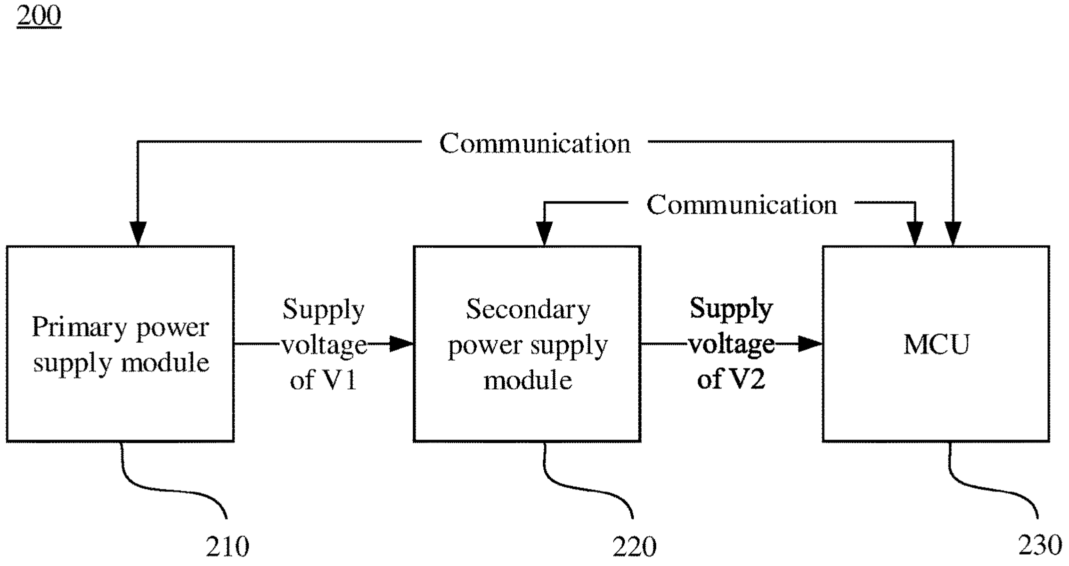
FIG. 2 is a schematic structural diagram of a power management system disclosed in an embodiment of this application.

FIG. 2 is a schematic structural diagram of a power management system according to an embodiment of this application. As shown in FIG. 2, a power management system 200 includes a primary power supply module 210, a secondary power supply module 220, and an MCU 230.

The primary power supply module 210 is connected to a power supply and includes a first voltage conversion unit, a first voltage monitoring unit, and a first storage unit, where the first voltage conversion unit is configured to generate a first voltage V1 based on a voltage of the power supply, the first voltage monitoring unit is configured to diagnose the first voltage V1, and the first storage unit is configured to store a diagnosis result of the first voltage V1.

The secondary power supply module 220 is connected to the primary power supply module 210 and includes a second voltage conversion unit, where the second voltage conversion unit is configured to generate a second voltage V2 based on the first voltage V1, the second voltage V2 being lower than the first voltage V1, and the second voltage V2 being an operating voltage of the MCU 230.

The MCU 230 is connected to the primary power supply module 210 and the secondary power supply module 220 and configured to read the diagnosis result of the first voltage V1 from the first storage unit and determine, based on the diagnosis result of the first voltage V1, whether to control the BMS to enter a safe state.

It can be seen that a two-stage power supply system including the primary power supply module 210 and the secondary power supply module 220 is used, so that the primary power supply module 210 can supply the first voltage V1 to the secondary power supply module 220, and the secondary power supply module 220 can supply the second voltage V2 to the MCU 230 based on the first voltage V1 for normal operation of the MCU 230. The secondary power supply module 220 is provided to supply a compatible voltage to the MCU 230, so that the compatibility between the power management system 200 and the MCU 230 is ensured. In addition, because the primary power supply module 210 can diagnose the first voltage V1, the MCU 230 can control the BMS to enter the safe state when the first voltage V1 experiences overvoltage or undervoltage by reading the diagnosis result of the first voltage V1, which improves the reliability of the power management system 200 and ensures the safety of the BMS.

Figure 3:
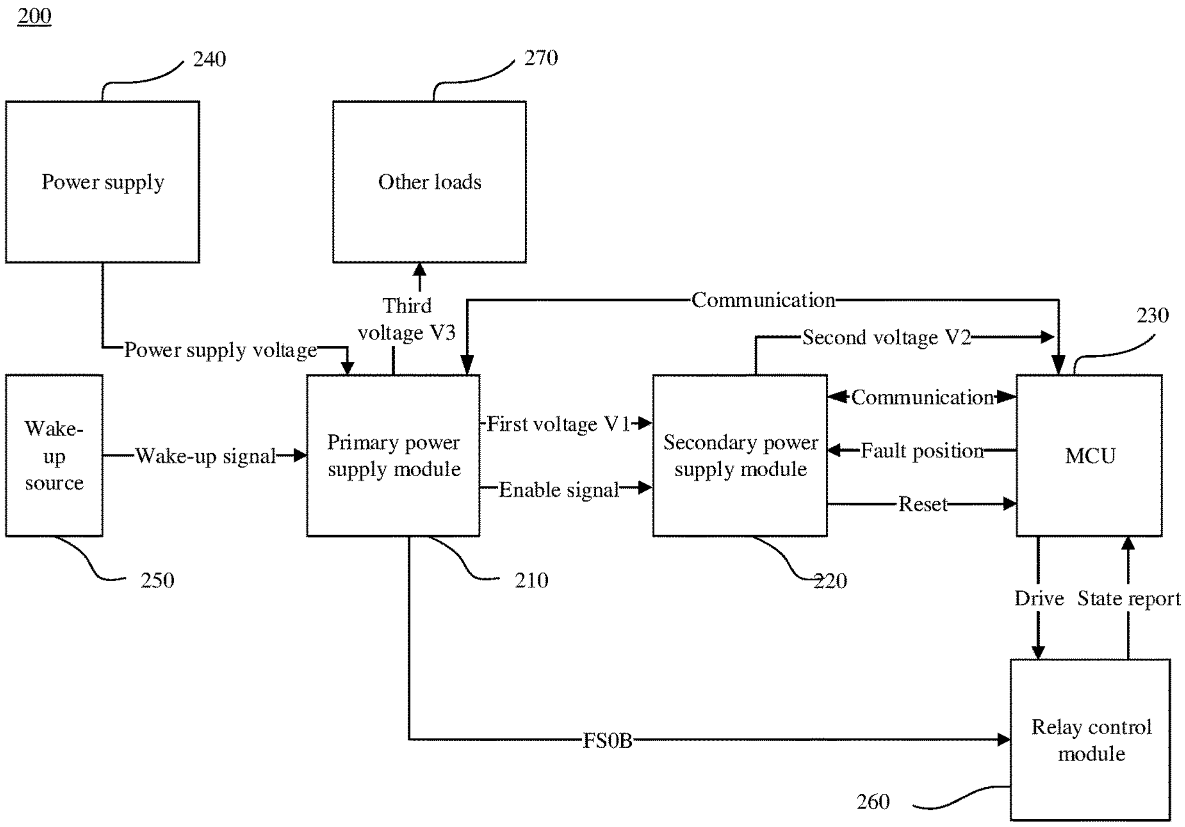
FIG. 3 is a schematic diagram of a possible specific structure of the power management system in FIG. 2.

For example, FIG. 3 shows a possible specific structure of the power management system 200 in FIG. 2. As shown in FIG. 3, the power management system 200 includes a primary power supply module 210, a secondary power supply module 220, an MCU 230, a power supply 240, a wake-up source 250, a relay control module 260, and other loads 270. A first voltage conversion unit in the primary power supply module 210 is configured to convert a power supply voltage output by the power supply 240 into a first voltage V1 and output the first voltage V1 to the secondary power supply module 220. A second voltage conversion unit in the secondary power supply module 220 is configured to generate a second voltage V2 based on the first voltage V1 and supply the second voltage V2 to the MCU 230.

For example, the first voltage V1 may be 3.3 V, and the second voltage V2 may be 1.8 V or 0.8 V. Optionally, the first voltage conversion unit can also output a third voltage V3. For example, the third voltage V3 may be an operating voltage of other loads in the BMS. The third voltage V3 is higher than the first voltage V1, for example, the third voltage V3 may be 5 V.

In an example in which V1=3.3V, V2=1.8 V or 0.8 V, and V3=5 V, as shown in FIG. 3, the primary power supply module 210 can simultaneously output two different voltages: a 5 V voltage and a 3.3 V voltage. It should be understood that in the upgraded MCU 230, some I/O ports that originally need the 5 V voltage no longer need the 5 V voltage, so the number of loads using the 5 V voltage is reduced. In this way, the primary power supply module 210 can simultaneously output two different voltages, without the problem of load imbalance of the primary power supply module 102 as described above. In addition, with the addition of the secondary power supply module 220 for outputting the 1.8 V/0.8 V voltage, as compared with that the 5 V voltage and the 1.8 V/0.8 V voltage are directly output by the primary power supply module 210, the output voltage is more reliable, and the complexity of the primary power supply module 210 is also reduced.

Further, as shown in FIG. 3, the power supply 240 in the power management system 200 is used to supply a voltage, for example, supply a 12 V voltage to the primary power supply module 210. The wake-up source 250 in the power management system 200 is connected to the primary power supply module 210 via a hard line and can output a wake-up signal, for example, a real-time clock (Real-Time Clock, RTC) signal, an ACNA signal, and an MCU LOCK signal. When the wake-up signal on the hard line is converted from low (LOW) to a pulse width modulation (Pulse Width Modulation, PWM) signal, the primary power supply module 210 is converted from a standby state (standby state) to a normal state (normal state).

There is no solution to diagnose the first voltage V1 due to lack of resources and other problems. However, when the first voltage V1 experiences overvoltage or undervoltage, it may lead to an abnormal operation or functional failure of the MCU 230. For this reason, a first voltage monitoring module and a first storage unit are also provided in the primary power supply module 210, where the first voltage monitoring unit is configured to diagnose the first voltage V1, and the first storage unit is configured to store a diagnosis result of the first voltage V1. The MCU 230 can read the diagnosis result of the first voltage V1 from the first storage unit 213 and determine, based on the diagnosis result of the first voltage V1, whether to control the BMS to enter a safe state.

For example, in an implementation, the first voltage monitoring unit is further configured to output a state signal, the state signal being used to indicate the diagnosis result of the first voltage V1, for example, the diagnosis result is that the first voltage V1 experiences overvoltage or undervoltage. In this case, the MCU 230 is configured to read the state signal, read the diagnosis result of the first voltage V1 from the first storage unit based on the state signal, and control the BMS to enter the safe state when diagnosis results of the first voltage V1 obtained from N consecutive readings all indicate that the first voltage V1 experiences overvoltage or undervoltage, N being a positive integer.

It should be understood that the control of the BMS into the safe state by the MCU 230 as described herein may mean that connection of a high voltage loop is broken by a relay, where the high voltage loop may be referred to as a battery power supply loop, and the relay is configured to control connection and disconnection of this loop. Alternatively, the control of the BMS into the safe state by the MCU 230 as described herein may mean that the MCU 230 undergoes power outage. In this case, due to the failure of the MCU 230, corresponding state indication information can be used to directly control the relay to break connection of the high voltage loop, so as to enable the BMS to enter the safe state.

In an implementation, as shown in FIG. 3, the power management system 200 further includes a relay control module 260, where the relay control module 260 is connected to the primary power supply module 210 and the MCU 230, and the first voltage monitoring unit in the primary power supply module 210 is further configured to send a safety signal FS0B to the relay control module 260 when the diagnosis result of the first voltage V1 is that the first voltage V1 experiences overvoltage or undervoltage. In this case, the relay control module 260 is configured to receive the safety signal FS0B and control, based on the safety signal FS0B, a relay to maintain connection of the high voltage loop within a preset duration.

The relay control module 260 in the power management system 200 includes a delay circuit. When the first voltage V1 experiences overvoltage or undervoltage, the MCU 230 can instruct the relay control module 260 to control the relay to break connection of the high voltage loop. In addition, the primary power supply module 210 outputs the safety signal FS0B to the relay control module 260 to maintain connection between the relay and the high voltage loop for some time via the delay circuit, preventing the risk caused by unstable voltage due to sudden disconnection of the relay.

For how the MCU 230 determines, based on the diagnosis result of the first voltage V1 read from the primary power supply module 210, whether to control the BMS to enter the safe state, this application provides two ways: way 1 and way 2. The following describes the two ways in detail with reference to FIG. 4 and FIG. 5.

Way 1

In this way, the MCU 230 reads the diagnosis result of the first voltage V1 and determines whether to control the BMS to enter the safe state.

In an implementation, the first voltage monitoring unit of the primary power supply module 210 is further configured to output a state signal, the state signal being used to indicate the diagnosis result of the first voltage. In this case, the MCU 230 is specifically configured to read the state signal, read the diagnosis result of the first voltage V1 from the first storage unit of the primary power supply module 210 based on the state signal, and control the BMS to enter the safe state when diagnosis results of the first voltage V1 obtained from N consecutive readings all indicate that the first voltage V1 experiences overvoltage or undervoltage, N being a positive integer.

After completing the diagnosis of the first voltage V1, the first voltage monitoring unit of the primary power supply module 210 outputs the state signal indicating the diagnosis result and stores the diagnosis result in the first storage unit. For example, the state signal may be a low-level signal or a high-level signal. For example, the low-level signal indicates that the first voltage V1 is within a normal range, and the high-level signal indicates that the first voltage V1 is in an overvoltage or undervoltage state. The first storage unit may be a register. For example, the 0×16 address of the register can be used as a flag bit to store the overvoltage state or undervoltage state of the first voltage V1, where the undervoltage state is stored at “BIT 5” and the overvoltage state is stored at “BIT 4”. When the flag bit is “0”, it means that the first voltage V1 experiences no undervoltage or overvoltage; and when the flag bit is “1”, the first voltage V1 experiences overvoltage or undervoltage.

It can be seen that, after detecting the state signal, the MCU 230 can determine, based on the state signal, a way of reading the diagnosis result of the first voltage from the primary power supply module 210, for example, a frequency at which such reading operation is performed. This can ensure the effective acquisition of the diagnosis result and can also reduce unnecessary reading operations, saving time and resources.

For example, when the state signal indicates that the diagnosis result of the first voltage V1 is that the first voltage V1 experiences overvoltage or undervoltage, the MCU 230 reads the diagnosis result of the first voltage V1 from the first storage unit at a frequency equal to a frequency at which the MCU 230 reads the state signal, so as to ensure reliable determining of the first voltage V1.

For another example, when the state signal indicates that the diagnosis result of the first voltage V1 is that the first voltage V1 experiences no overvoltage or undervoltage, the MCU 230 reads the diagnosis result of the first voltage V1 from the first storage unit at a frequency lower than a frequency at which the MCU reads the state signal, avoiding unnecessary reading operations.

Figure 4:
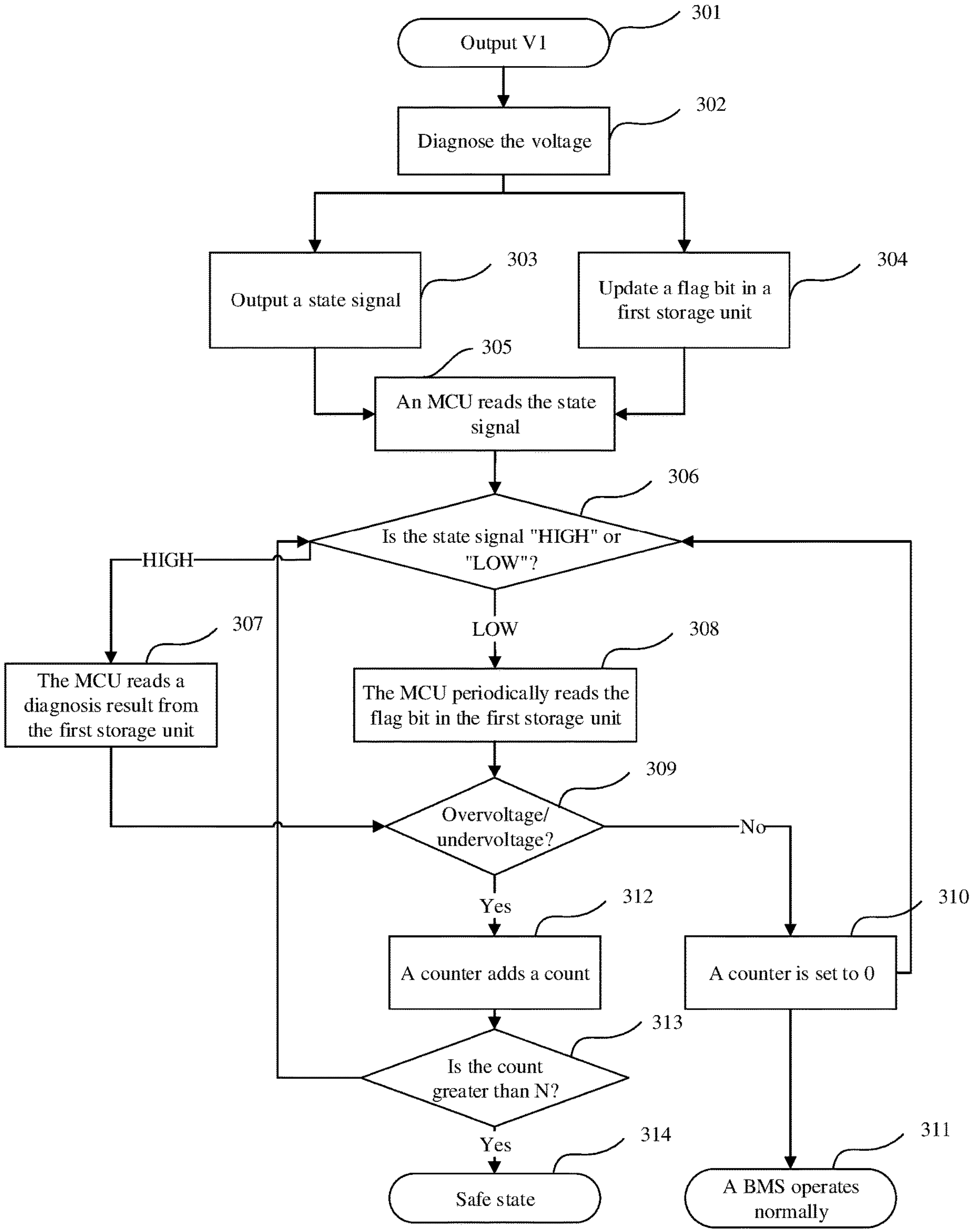
FIG. 4 is a schematic flowchart of a voltage diagnosis process disclosed in an embodiment of this application.

The following describes details with reference to FIG. 4. FIG. 4 is a possible specific implementation of a voltage diagnosis scheme in way 1. As shown in FIG. 4, step 301 to step 304 are performed by the primary power supply module 210, and step 305 to step 314 are performed by the MCU 230. As shown in FIG. 4, some or all of the following steps are specifically included.

In step 301, the primary power supply module 210 outputs the first voltage V1.

In step 302, the first voltage monitoring unit of the primary power supply module 210 diagnoses the first voltage V1.

For example, the first voltage V1 can be input into a voltage comparator and compared with an undervoltage threshold and an overvoltage threshold, so as to determine whether the first voltage V1 experiences overvoltage or undervoltage.

In step 303, the primary power supply module 210 outputs the state signal.

In step 304, the primary power supply module 210 updates the flag bit used for storing the diagnosis result in the first storage unit.

In step 305, the MCU 230 reads the state signal output by the primary power supply module 210.

In step 306, the MCU 230 determines whether the state signal is "HIGH" or "LOW".

When the state signal is at a high level indicated as "HIGH", it indicates that the current diagnosis result is that the first voltage V1 experiences undervoltage or overvoltage, and step 307 is then performed. When the state signal is at a low level indicated as "LOW", it indicates that the current diagnosis result is that the first voltage V1 experiences no undervoltage or overvoltage, and step 308 is then performed.

In step 307, the MCU 230 reads the diagnosis result of the first voltage V1 from the first storage unit.

In step 308, the MCU 230 periodically reads the diagnosis result of the first voltage V1 from the first storage unit.

For example, the reading period may be 100 ms.

It should be noted that in step 307 and step 308, when the state signal is "HIGH", it indicates that the current diagnosis result may be that the first voltage V1 experiences undervoltage or overvoltage, so the MCU 230 immediately reads the corresponding flag bit in the first storage unit to determine whether the flag bit indicates that the first voltage V1 experiences undervoltage or overvoltage. It can be seen from FIG. 4 that, every time the MCU 230 detects "HIGH", the MCU 230 reads the diagnosis result once from the first storage unit, meaning that the MCU 230 reads the diagnosis result of the first voltage V1 from the first storage unit at a frequency equal to a frequency at which the MCU 230 reads the state signal, thereby ensuring that whether the first voltage V1 experiences overvoltage or undervoltage is accurately determined, and ensuring reliable voltage diagnosis. When the state signal is "LOW", it indicates that the current diagnosis result is that the first voltage V1 experiences no undervoltage or overvoltage, and the MCU 230 can read the corresponding flag bit in the first storage unit at a given period. In this case, the MCU 230 reads the diagnosis result of the first voltage V1 from the first storage unit at a frequency lower than a frequency at which the MCU 230 reads the state signal, avoiding unnecessary reading operations, thereby saving time and resources.

In step 309, based on the corresponding flag bit in the first storage unit, the MCU 230 determines whether the first voltage V1 experiences overvoltage or undervoltage.

For example, if the MCU 230 reads the corresponding flag bit in the first storage unit as "0", it indicates that the first voltage V1 experiences no overvoltage or undervoltage, step 310 and step 311 are performed. If the MCU 230 reads the corresponding flag bit in the first storage unit as "1", it indicates that the first voltage V1 is in an overvoltage or undervoltage state, step 312 to step 314 are performed.

In step 310, a counter is set to 0.

In step 311, the BMS is controlled to maintain normal operation.

In step 312, the counter adds 1 to a fault count recorded.

For example, the fault count includes an overvoltage count, an undervoltage count, or a total count of overvoltage and undervoltage.

In step 313, whether the fault count recorded by the counter exceeds N is determined.

When the fault count recorded by the counter is greater than N, step 314 is then performed, otherwise step 306 is returned.

In step 314, the BMS is controlled to enter the safe state.

In step 312 to step 314, when the MCU 230 consecutively reads the corresponding flag bit in the register for N times and each time the flag bit indicates that the first voltage V1 experiences overvoltage or undervoltage, for example, when the flag bit is consecutively detected as "1" for N times, the MCU 230 controls the relay to disconnect the high voltage loop, so as to ensure that the BMS enters the safe state. Setting an appropriate value for N can improve the reliability of the diagnosis result.

Way 2

In this way, the MCU 230 and the secondary power supply module 220 respectively read the diagnosis result in the first storage unit of the primary power supply module 210 and the state signal output by the primary power supply module 210, and determine whether to control the BMS to enter the safe state.

In an implementation, the MCU 230 is specifically configured to periodically read the diagnosis result of the first voltage from the first storage unit of the primary power supply module 210 and control the BMS to enter the safe state when diagnosis results of the first voltage obtained from N consecutive readings all indicate that the first voltage experiences overvoltage or undervoltage.

In another implementation, the first voltage monitoring unit is further configured to output the state signal, the state signal being used to indicate the diagnosis result of the first voltage V1. In this case, the secondary power supply module 220 is further configured to receive the state signal and prohibit output of the second voltage V2 when the state signal indicates that the diagnosis result of the first voltage V1 is that the first voltage V1 experiences overvoltage or undervoltage.

It should be understood that when the secondary power supply module 220 prohibits output of the second voltage V2 to the MCU 230, the MCU 230 undergoes power outage. In this case, due to the failure of the MCU 230, corresponding state indication information can be used to directly control the relay to break connection of the high voltage loop, so as to enable the BMS to enter the safe state.

It can be seen that the MCU 230 reads the diagnosis result of the first voltage V1 from the first storage unit and control the BMS to enter the safe state when diagnosis results of the first voltage V1 obtained from N consecutive readings all indicate that the first voltage V1 experiences overvoltage or undervoltage, improving the safety of the BMS. In addition, the secondary power supply module 220 reads the state signal output by the primary power supply module 210 and no longer outputs the second voltage V2 to the MCU 230 when the state signal indicates that the first voltage V1 experiences overvoltage or undervoltage, so as to enable the BMS to enter the safe state, avoiding the risk caused by the failure to read the diagnosis result due to the failure of the MCU 230. The MCU 230 and the secondary power supply module 220 jointly participate in determining the diagnosis result of the first voltage V1, so that the safety of the BMS is further improved.

Figure 5:
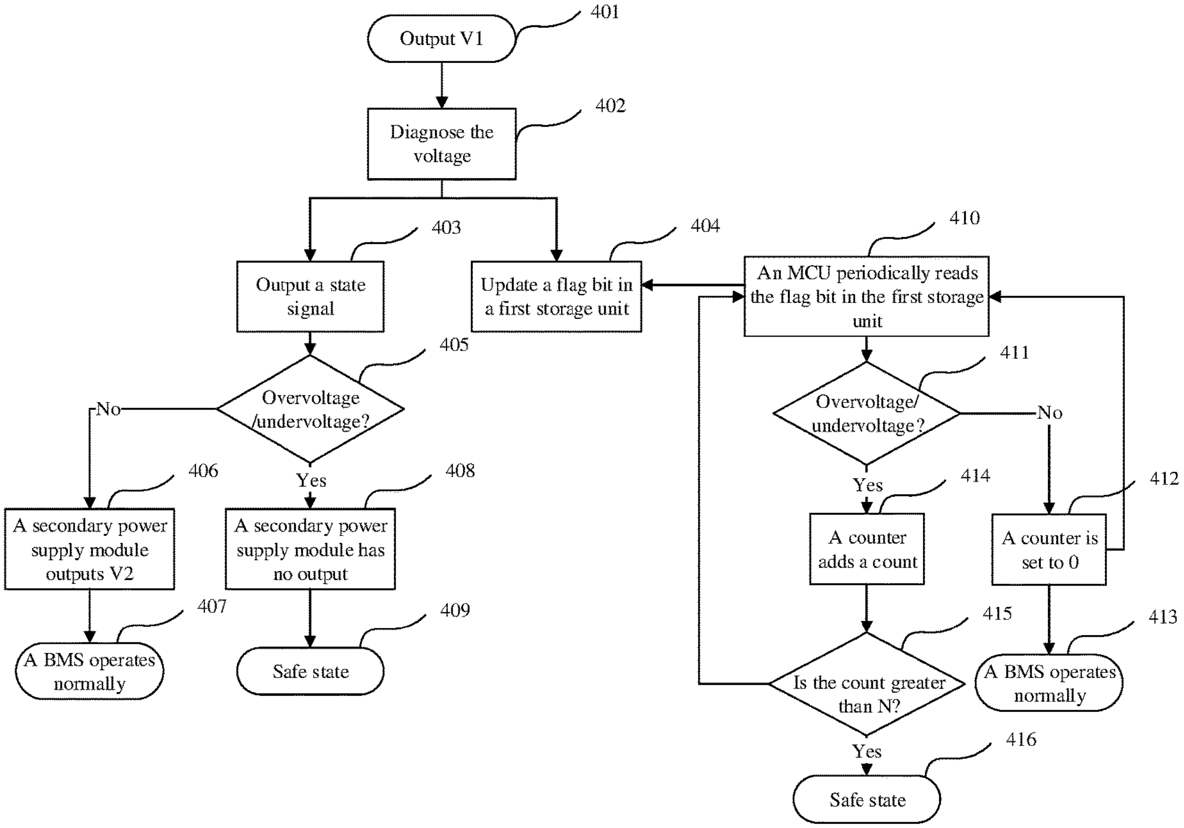
FIG. 5 is a schematic flowchart of a voltage diagnosis process disclosed in another embodiment of this application.

The following describes details with reference to FIG. 5. FIG. 5 is a possible specific implementation of a voltage diagnosis scheme in way 2. Step 401 to step 404 are performed by the primary power supply module 210, step 405 to step 409 are performed by the secondary power supply module 220, and step 410 to step 416 are performed by the MCU 230. As shown in FIG. 5, some or all of the following steps are specifically included.

In step 401, the primary power supply module 210 outputs the first voltage V1.

In step 402, the first voltage monitoring unit of the primary power supply module 210 diagnoses the first voltage V1.

For example, the first voltage V1 can be input into a voltage comparator and compared with an undervoltage threshold and an overvoltage threshold, so as to determine whether the first voltage V1 experiences overvoltage or undervoltage.

In step 403, the primary power supply module 210 outputs the state signal.

In step 404, the primary power supply module 210 updates the flag bit used for storing the diagnosis result in the first storage unit.

In step 405, the secondary power supply module 220 determines whether the state signal is "HIGH" or "LOW".

When the state signal is at a high level indicated as "HIGH", it indicates that the current diagnosis result is that the first voltage V1 experiences undervoltage or overvoltage, and the secondary power supply module 220 then performs step 408 and step 409. When the state signal is at a low level indicated as "LOW", it indicates that the current diagnosis result is that the first voltage V1 experiences no undervoltage or overvoltage, and the secondary power supply module 220 then performs step 406 and step 407.

In step 406, the secondary power supply module 220 outputs the second voltage V2 to the MCU 230.

In step 407, the BMS is controlled to maintain normal operation.

In step 408, the secondary power supply module 220 stops outputting the second voltage V2 to the MCU 230.

In step 409, the BMS is controlled to enter the safe state.

In step 410, the MCU 230 periodically reads the diagnosis result of the first voltage V1 from the first storage unit.

For example, the reading period may be 100 ms.

In step 411, based on the corresponding flag bit in the first storage unit, the MCU 230 determines whether the first voltage V1 experiences overvoltage or undervoltage.

For example, if the MCU 230 reads the corresponding flag bit in the first storage unit as "0", it indicates that the first voltage V1 experiences no overvoltage or undervoltage, step 412 and step 413 are performed. If the MCU 230 reads the corresponding flag bit in the first storage unit as "1", it indicates that the first voltage V1 is in an overvoltage or undervoltage state, step 414 to step 416 are performed.

In step 412, a counter is set to 0.

In step 413, the BMS is controlled to maintain normal operation.

In step 414, the counter adds 1 to a fault count recorded.

For example, the fault count includes an overvoltage count, an undervoltage count, or a total count of overvoltage and undervoltage.

In step 415, whether the fault count recorded by the counter exceeds N is determined.

When the fault count recorded by the counter is greater than N, step 416 is then performed, otherwise step 410 is performed.

In step 416, the BMS is controlled to enter the safe state.

In step 414 to step 416, when the MCU 230 consecutively reads the corresponding flag bit in the register for N times and each time the flag bit indicates that the first voltage V1 experiences overvoltage or undervoltage, for example, when the flag bit is consecutively detected as "1" for N times, the MCU 230 controls the relay to disconnect the high voltage loop, so as to ensure that the BMS enters the safe state. Setting an appropriate value for N can improve the reliability of the diagnosis result.

In the foregoing way 1 and way 2, way 1 is that the MCU 230 detects the state signal output by the primary power supply module 210 and reads the diagnosis result stored in the first storage unit of the primary power supply module 210, reducing the complexity of the secondary power supply module 220. In addition, based on the diagnosis result indicated by the state signal, the MCU 230 can adjust the frequency at which the MCU 230 reads the diagnosis result from the first storage unit. However, if the MCU 230 has a failure, once the first voltage V1 experiences overvoltage or undervoltage, it cannot guarantee that the BMS enters the safe state. In addition, the state signal in way 1 is used to notify the MCU 230 to read the diagnosis result from the first storage unit, but the state signal itself does not participate in the actual overvoltage or undervoltage determining process, with a small effect on improving system reliability. In way 2, the MCU 230 and the secondary power supply module 220 respectively read the diagnosis result from the first storage unit of the primary power supply module 210 and the state signal output by the primary power supply module 210. The state signal output by the primary power supply module and the stored diagnosis result participate in the actual overvoltage or undervoltage determining process. A dual redundant fault handling method is used, avoiding the risk caused by the failure to read the diagnosis result due to a single-point failure of the MCU 230, thereby achieving higher system reliability.

In a possible implementation, the secondary power supply module 220 further includes a second voltage monitoring unit and a second storage unit, where the second voltage monitoring unit is configured to diagnose the second voltage V2, and the second storage unit is configured to store a diagnosis result of the second voltage V2. The MCU 230 is further configured to read the diagnosis result of the second voltage V2 from the second storage unit and determine, based on the diagnosis result of the second voltage V2, whether to control the BMS to enter the safe state.

In this embodiment, in addition to detecting the state signal output by the primary power supply module 210, the MCU 230 also reads the diagnosis result of the second voltage V2 from the secondary power supply module 220 and controls the BMS to enter the safe state when the second voltage V2 experiences overvoltage or undervoltage, further improving the safety of the BMS.

In an implementation, the MCU 230 is further configured to detect a state of the MCU 230 and send a fault signal to the secondary power supply module 220 when the state of the MCU 230 indicates a fault. The secondary power supply module 220 is further configured to receive the fault signal and send a reset signal to the MCU 230 based on the fault signal.

As shown in FIG. 3, the MCU 230 and the secondary power supply module 220 have corresponding pins that can be configured to transmit the fault signal and the reset signal. With the self-detection of the MCU 230, the MCU 230 can notify the secondary power supply module 220 in case of a fault of the MCU 230, and the secondary power supply module 220 can reset the MCU 230, thus ensuring normal and effective operation of the MCU 230.

In an implementation, the MCU 230 is connected to the primary power supply module 210 via an I2C bus, and/or the MCU 230 is connected to the secondary power supply module 220 via an I2C bus. With the I2C bus, interaction of the state signal, the diagnosis result, and other information can be implemented between the MCU 230 and the primary power supply module 210, and between the MCU 230 and the secondary power supply module 220.

Diagnosis methods of overvoltage and undervoltage are not limited in this embodiment of this application. For example, for the first voltage V1, a comparator can be used for comparing a current detection value of the first voltage V1 with a target value to determine whether the first voltage V1 experiences overvoltage or undervoltage.

Figure 6:
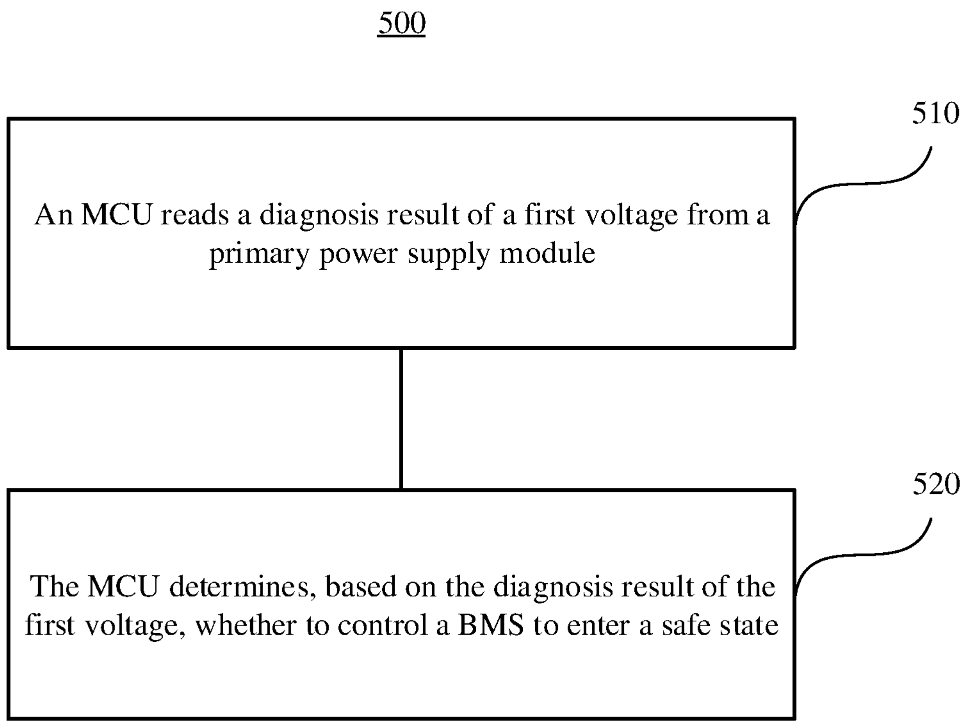
FIG. 6 is a schematic flowchart of a control method of power management system disclosed in another embodiment of this application.

FIG. 6 is a control method 500 of power management system according to an embodiment of this application. A power management system 200 includes a primary power supply module 210 and a secondary power supply module 220, where the primary power supply module 210 is connected to a power supply and configured to generate a first voltage V1 based on a voltage of the power supply, diagnose the first voltage V1, and store a diagnosis result of the first voltage V1; and the secondary power supply module 220 is connected to the primary power supply module 210 and configured to generate a second voltage V2 based on the first voltage V1, the second voltage V2 being lower than the first voltage V1, the second voltage V2 being an operating voltage of an MCU 230, and the MCU 230 being connected to the primary power supply module 210 and the secondary power supply module 220.

As shown in FIG. 6, for example, the method 500 can be performed by the foregoing MCU 230. The method 500 includes some or all of the following steps.

In step 510, the MCU 230 reads the diagnosis result of the first voltage V1 from the primary power supply module 210.

In step 520, the MCU 230 determines, based on the diagnosis result of the first voltage V1, whether to control a BMS to enter a safe state.

Based on this technical solution, a two-stage power supply system is used in the power management system 200, including the primary power supply module 210 and the secondary power supply module 220, where the primary power supply module 210 supplies the first voltage V1 to the secondary power supply module 220, and the secondary power supply module 220 supplies the second voltage V2 to the MCU 230 based on the first voltage for normal operation of the MCU 230 in the BMS. The secondary power supply module is provided to supply a compatible voltage to the MCU, so that the compatibility between the power management system of the BMS and the MCU is ensured. In addition, because the primary power supply module 210 can diagnose the first voltage V1, the MCU 230 can control the BMS to enter the safe state when the first voltage V1 experiences overvoltage or undervoltage by reading the diagnosis result of the first voltage V1, improving the reliability of the BMS.

In an implementation, the method 500 further includes reading, by the MCU 230, a state signal output by the primary power supply module 210, where the state signal is used to indicate the diagnosis result of the first voltage V1. The determining, by the MCU 230 based on the diagnosis result of the first voltage V1, whether to control the BMS to enter a safe state includes: reading, by the MCU 230 based on the state signal, the diagnosis result of the first voltage V1 from the primary power supply module 210, and controlling the BMS to enter the safe state when diagnosis results of the first voltage V1 obtained from N consecutive readings all indicate that the first voltage V1 experiences overvoltage or undervoltage, N being a positive integer.

In an implementation, the method 500 further includes: when the state signal indicates that the diagnosis result of the first voltage V1 is that the first voltage V1 experiences overvoltage or undervoltage, reading, by the MCU 230, the diagnosis result of the first voltage V1 from the first storage unit at a frequency equal to a frequency at which the MCU reads the state signal; or when the state signal indicates that the diagnosis result of the first voltage V1 is that the first voltage V1 experiences no overvoltage or undervoltage, reading, by the MCU 230, the diagnosis result of the first voltage V1 from the first storage unit at a frequency lower than a frequency at which the MCU reads the state signal.

In an implementation, the determining, by the MCU 230 based on the diagnosis result of the first voltage V1, whether to control the BMS to enter a safe state includes: periodically reading, by the MCU 230, the diagnosis result of the first voltage V1 from the primary power supply module 210 and controlling the BMS to enter the safe state when diagnosis results of the first voltage V1 obtained from N consecutive readings all indicate that the first voltage V1 experiences overvoltage or undervoltage.

In an implementation, the first voltage V1 monitoring unit is further configured to output the state signal, the state signal being used to indicate the diagnosis result of the first voltage V1. The secondary power supply module 220 is further configured to receive the state signal and prohibit output of the second voltage V2 to the MCU 230 when the state signal indicates that the diagnosis result of the first voltage V1 is that the first voltage V1 experiences overvoltage or undervoltage.

In an implementation, the secondary power supply module 220 is further configured to diagnose the second voltage V2 and store a diagnosis result of the second voltage V2. The method 500 further includes reading, by the MCU 230, the diagnosis result of the second voltage V2 from the secondary power supply module 220. The method 500 further includes determining, based on the diagnosis result of the second voltage V2, whether to control the BMS to enter the safe state.

In an implementation, the method 500 further includes: detecting, by the MCU 230, a state of the MCU 230; sending a fault signal to the secondary power supply module 220 when the MCU 230 detects that the state of the MCU 230 indicates a fault; and receiving, by the MCU 230, a reset signal sent by the secondary power supply module 220 based on the fault signal.

In an implementation, the MCU 230 is connected to the primary power supply module via an I2C bus, and/or the MCU 230 is connected to the secondary power supply module 220 via an I2C bus.

In an implementation, the first voltage V1 is 3.3 V, and the second voltage is 1.8 V or 0.8 V.

It should be understood that, for the specific details in the various implementations of the method 500, reference may be made to the foregoing relevant descriptions of the MCU 230. For brevity, details are not described herein again.

This application further provides an MCU configured to perform operations that are performed by the MCU 230 according to any one of the foregoing embodiments.

This application further provides a BMS including the power management system 200 and the MCU 230 according to any one of the foregoing embodiments.

This application further provides a battery including the BMS according to any one of the foregoing embodiments.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A power management system, comprising:

a primary power supply module, configured to be connected to a power supply and comprising a first voltage conversion unit, a first voltage monitoring unit, and a first storage unit, wherein the first voltage conversion unit is configured to generate a first voltage based on a voltage of the power supply, the first voltage monitoring unit is configured to diagnose the first voltage and output a state signal indicating a diagnosis result of the first voltage, and the first storage unit is configured to store the diagnosis result of the first voltage;

a secondary power supply module, connected to the primary power supply module and comprising a second voltage conversion unit, wherein the second voltage conversion unit is configured to generate a second voltage based on the first voltage, and the second voltage is lower than the first voltage; and a micro-controller unit (MCU), connected to the primary power supply module and the secondary power supply module and configured to:

read the state signal, and read the diagnosis result of the first voltage from the first storage unit based on the state signal, including:

in response to the state signal indicating that the diagnosis result of the first voltage is that the first voltage experiences overvoltage or undervoltage, reading the diagnosis result of the first voltage from the first storage unit at a frequency equal to a frequency at which the MCU reads the state signal; and/or in response to the state signal indicating that the diagnosis result of the first voltage is that the first voltage experiences no overvoltage or undervoltage, reading the diagnosis result of the first voltage from the first storage unit at a frequency lower than the frequency at which the MCU reads the state signal; and control a battery management system (BMS) to enter a safe state in response to diagnosis results of the first voltage obtained from N consecutive readings all indicating that the first voltage experiences overvoltage or undervoltage, N being a positive integer, and the second voltage being an operating voltage of the MCU.

2. The power management system according to claim 1, wherein the secondary power supply module is further configured to receive the state signal and prohibit output of the second voltage to the MCU in response to the state signal indicating that the diagnosis result of the first voltage is that the first voltage experiences overvoltage or undervoltage.

3. The power management system according to claim 1, wherein:

the secondary power supply module further comprises a second voltage monitoring unit and a second storage unit, the second voltage monitoring unit being configured to diagnose the second voltage, and the second storage unit being configured to store a diagnosis result of the second voltage; and the MCU is further configured to read the diagnosis result of the second voltage from the second storage unit and determine, based on the diagnosis result of the second voltage, whether to control the BMS to enter the safe state.

4. The power management system according to claim 1, wherein the MCU is further configured to detect a state of the MCU and send a fault signal to the secondary power supply module in response to the state of the MCU indicating a fault; and the secondary power supply module is further configured to receive the fault signal and send a reset signal to the MCU based on the fault signal.

5. The power management system according to claim 1, further comprising:

a relay control module, the relay control module being connected to the primary power supply module and the MCU;

wherein:

the first voltage monitoring unit is further configured to send a safety signal to the relay control module in response to the diagnosis result of the first voltage being that the first voltage experiences overvoltage or undervoltage; and the relay control module is configured to receive the safety signal and control, based on the safety signal, a relay to maintain connection of a high voltage loop within a preset duration.

6. The power management system according to claim 1, wherein:

the first voltage conversion unit is further configured to generate a third voltage based on the voltage of the power supply, the third voltage being an operating voltage of other loads in the BMS, and the third voltage being higher than the first voltage.

7. The power management system according to claim 1, wherein:

the MCU is connected to the primary power supply module via an I2C bus; and/or the MCU is connected to the secondary power supply module via an I2C bus.

8. The power management system according to claim 1, wherein the first voltage is 3.3 V, and the second voltage is 1.8 V or 0.8 V.

9. A control method of a power management system, the power management system comprising a primary power supply module, a secondary power supply module, and a micro-controller unit (MCU) connected to the primary power supply module and the secondary power supply module, the primary power supply module comprising a first storage unit configured to store a diagnosis result of the first voltage and the primary power supply module being configured to be connected to a power supply and configured to generate a first voltage based on a voltage of the power supply, diagnose the first voltage, and store the diagnosis result of the first voltage, the secondary power supply module being connected to the primary power supply module and configured to generate a second voltage based on the first voltage, the second voltage being lower than the first voltage, and the second voltage being an operating voltage of the MCU, the method comprising:

reading, by the MCU, a state signal output by the primary power supply module, the state signal being used to indicate the diagnosis result of the first voltage;

reading, by the MCU based on the state signal, the diagnosis result of the first voltage from the primary power supply module, including:

in response to the state signal indicating that the diagnosis result of the first voltage is that the first voltage experiences overvoltage or undervoltage, reading, by the MCU, the diagnosis result of the first voltage from the first storage unit at a frequency equal to a frequency at which the MCU reads the state signal; or in response to the state signal indicating that the diagnosis result of the first voltage is that the first voltage experiences no overvoltage or undervoltage, reading, by the MCU, the diagnosis result of the first voltage from the first storage unit at a frequency lower than the frequency at which the MCU reads the state signal; and controlling a battery management system (BMS) to enter a safe state in response to diagnosis results of the first voltage obtained from N consecutive readings all indicating that the first voltage experiences overvoltage or undervoltage, N being a positive integer.

10. The control method according to claim 9, wherein the secondary power supply module is further configured to diagnose the second voltage and store a diagnosis result of the second voltage;

the method further comprising:

reading, by the MCU, the diagnosis result of the second voltage from the secondary power supply module; and determining, based on the diagnosis result of the second voltage, whether to control the BMS to enter the safe state.

11. The control method according to claim 9, further comprising:

detecting, by the MCU, a state of the MCU;

sending a fault signal to the secondary power supply module in response to the MCU detecting that the state of the MCU indicates a fault; and receiving, by the MCU, a reset signal sent by the secondary power supply module based on the fault signal.

12. A micro-controller unit (MCU), configured to perform the control method according to claim 9.

13. A battery management system (BMS), comprising:

a power management system comprising:

a primary power supply module, configured to be connected to a power supply and comprising a first voltage conversion unit, a first voltage monitoring unit, and a first storage unit, wherein the first voltage conversion unit is configured to generate a first voltage based on a voltage of the power supply, the first voltage monitoring unit is configured to diagnose the first voltage and output a state signal indicating a diagnosis result of the first voltage, and the first storage unit is configured to store the diagnosis result of the first voltage;

a secondary power supply module, connected to the primary power supply module and comprising a second voltage conversion unit, wherein the second voltage conversion unit is configured to generate a second voltage based on the first voltage, and the second voltage is lower than the first voltage; and a micro-controller unit (MCU), connected to the primary power supply module and the secondary power supply module and configured to:

read the state signal, and read the diagnosis result of the first voltage from the first storage unit based on the state signal, including:

in response to the state signal indicating that the diagnosis result of the first voltage is that the first voltage experiences overvoltage or undervoltage, reading the diagnosis result of the first voltage from the first storage unit at a frequency equal to a frequency at which the MCU reads the state signal; and/or in response to the state signal indicating that the diagnosis result of the first voltage is that the first voltage experiences no overvoltage or undervoltage, reading the diagnosis result of the first voltage from the first storage unit at a frequency lower than the frequency at which the MCU reads the state signal; and control the BMS to enter a safe state in response to diagnosis results of the first voltage obtained from N consecutive readings all indicating that the first voltage experiences overvoltage or undervoltage, N being a positive integer, and the second voltage being an operating voltage of the MCU.

14. A battery, comprising the BMS according to claim 13.

* * * * *